United States Patent
Ogaki et al.

(10) Patent No.: US 10,290,254 B2
(45) Date of Patent: May 14, 2019

(54) IMAGE PROCESSING APPARATUS, DISPLAY APPARATUS, AND COMPUTER-READABLE STORAGE MEDIUM

(71) Applicant: EIZO Corporation, Ishikawa (JP)

(72) Inventors: Mamoru Ogaki, Ishikawa (JP); Yusuke Bamba, Ishikawa (JP); Reo Aoki, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/856,079

(22) Filed: Dec. 28, 2017

(65) Prior Publication Data
US 2018/0122285 A1 May 3, 2018

Related U.S. Application Data

(63) Continuation of application No. PCT/JP2016/064030, filed on May 11, 2016.

(30) Foreign Application Priority Data

Jul. 8, 2015 (JP) .................................. 2015-137126

(51) Int. Cl.
*G06T 5/00* (2006.01)
*G09G 3/20* (2006.01)
(Continued)

(52) U.S. Cl.
CPC ............. *G09G 3/2007* (2013.01); *G06T 5/00* (2013.01); *G06T 5/003* (2013.01); *G06T 5/20* (2013.01);
(Continued)

(58) Field of Classification Search
CPC ......... G09G 3/2007; G09G 2320/0276; G09G 2320/0626; G09G 2320/08;
(Continued)

(56) References Cited

U.S. PATENT DOCUMENTS

| 6,058,248 A * | 5/2000 | Atkins | G06T 3/4007 358/1.2 |
| 2005/0105830 A1* | 5/2005 | Chung | G06T 3/403 382/300 |

(Continued)

FOREIGN PATENT DOCUMENTS

| JP | H10149442 A | 6/1998 |
| JP | 2002158892 A | 5/2002 |

(Continued)

OTHER PUBLICATIONS

International Search Report for International Patent Application No. PCT/JP2016/064030, issued by the Japan Patent Office dated Aug. 9, 2016.

*Primary Examiner* — Chong Wu

(57) ABSTRACT

Technology is known for correcting the gradation characteristics of an input image signal in accordance with the characteristics of a display device, but a correction that is suitable for the usage of the display device is desired. Provided is an image processing apparatus including a first gradation converting section that converts a gradation of an image signal input thereto; a sharpening process section that performs a sharpening process on the image signal after the gradation has been converted by the first gradation converting section; a second gradation converting section that converts the gradation of the image signal after the sharpening process has been performed; and a display control section that displays an image indicated by the image signal after the gradation has been converted by the second gradation converting section, in a display device.

8 Claims, 10 Drawing Sheets

(51) Int. Cl.
    *G09G 5/00*    (2006.01)
    *G09G 5/10*    (2006.01)
    *G09G 5/36*    (2006.01)
    *G06T 5/20*    (2006.01)
    *G09G 5/06*    (2006.01)

(52) U.S. Cl.
    CPC ............... *G09G 5/00* (2013.01); *G09G 5/06* (2013.01); *G09G 5/10* (2013.01); *G09G 5/36* (2013.01); *G09G 2320/0276* (2013.01); *G09G 2320/0626* (2013.01); *G09G 2320/08* (2013.01); *G09G 2340/0428* (2013.01); *G09G 2360/16* (2013.01)

(58) Field of Classification Search
    CPC ........ G09G 2360/16; G09G 5/00; G09G 5/06; G09G 5/10; G09G 5/36; G09G 2340/0428; G06T 5/003; G06T 5/20; G06T 5/00
    See application file for complete search history.

(56) References Cited

U.S. PATENT DOCUMENTS

2006/0232801 A1    10/2006    Hoshii
2016/0371821 A1*  12/2016    Hayashi ............... H04N 5/3572

FOREIGN PATENT DOCUMENTS

| | | |
|---|---|---|
| JP | 2003281534 A | 10/2003 |
| JP | 2003331286 A | 11/2003 |
| JP | 2008197437 A | 8/2008 |
| JP | 2011181105 A | 9/2011 |
| JP | 2014-002325 A | 1/2014 |

\* cited by examiner

IMAGE PROCESSING APPARATUS, DISPLAY APPARATUS, AND COMPUTER-READABLE STORAGE MEDIUM The contents of the following patent applications are incorporated herein by reference: Japanese Patent Application No. 2015-137126, filed on Jul. 8, 2015, and International Patent Application No. PCT/JP2016/064030, filed on May 11, 2016.

BACKGROUND

1. Technical Field

The present invention relates to an image processing apparatus, a display apparatus, and a computer-readable storage medium.

2. Related Art

Technology is known for correcting the gradation characteristics of an input image signal in accordance with the characteristics of a display device, as shown in Patent Document 1, for example. Patent Document 1: Japanese Patent Application Publication No. 2014-002325

A correction that is suitable for the usage of the display device has been desired.

SUMMARY

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
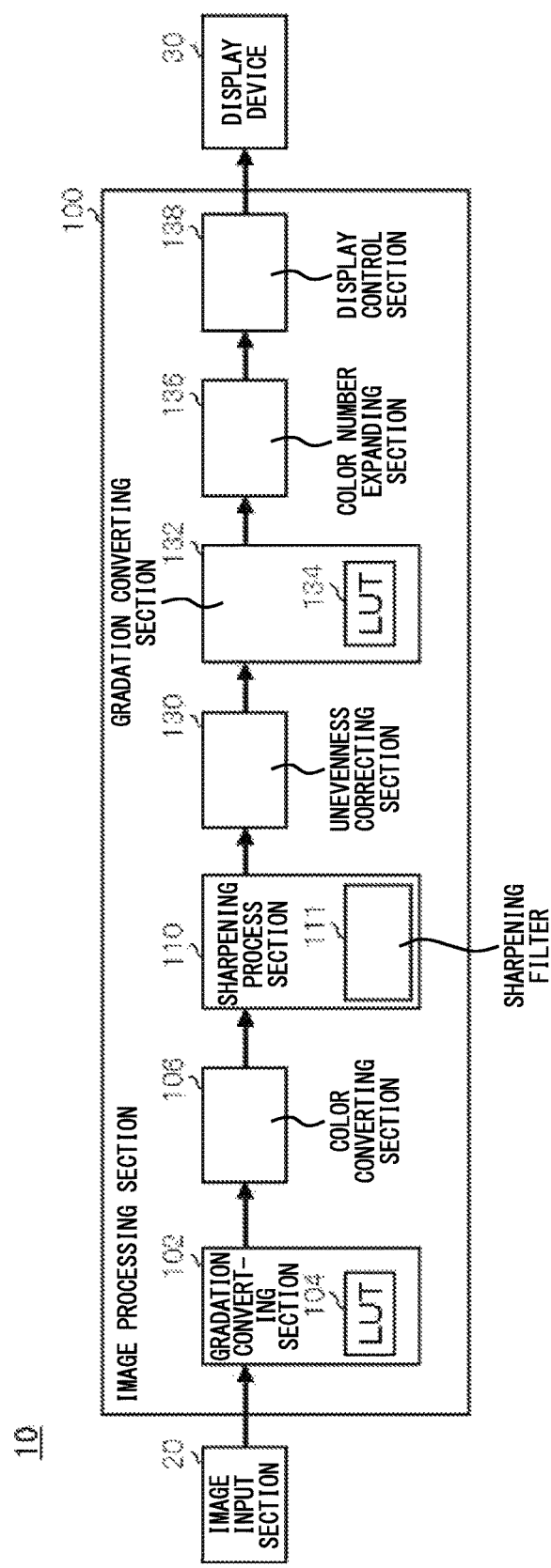
FIG. 1 is a functional configuration diagram schematically showing an exemplary functional configuration of the display apparatus 10.

FIG. 1 is a functional configuration diagram schematically showing an exemplary functional configuration of a display apparatus 10. The display apparatus 10 according to the present embodiment may be a color image display apparatus. The display apparatus 10 may be a monochrome image display apparatus. The display apparatus 10 includes an image input section 20, a display device 30, and an image processing section 100.

The image input section 20 handles the input of an image signal indicating an image. For example, the image input section 20 handles the input of an image signal from external equipment such as a PC (Personal Computer). The image input section 20 may include a connection terminal connected to the external equipment via a cable.

The image input section 20 may handle arbitrary types of image signals such as RGB image signals and YUV image signals. For example, the image input section 20 handles an image signal in which the gradation is expressed by 8 bits for each of R, G, and B. The gradations of the image signals handled by the image input section 20 are not limited to being expressed by 8 bits.

The display device 30 displays an image indicated by the image signal handled by the image input section 20. The display device 30 may include a display panel such as a liquid crystal panel, a PDP (Plasma Display Panel), or an organic EL (Electroluminescence) panel, for example.

The image processing section 100 receives the image signal from the image input section 20, applies processing to this image signal, and displays the image indicated by the processed image signal in the display device 30. The image processing section 100 may be an example of the image processing apparatus. The image processing section 100 includes a gradation converting section 102, a color converting section 106, a sharpening process section 110, an unevenness correcting section 130, a gradation converting section 132, a color number expanding section 136, and a display control section 138.

The gradation converting section 102 converts the gradation of the image signal received from the image input section 20. The gradation converting section 102 may convert the gradation of the image signal using an LUT (Lookup Table) 104. The LUT 104 may include associations between a gradation value of the input image signal and a gradation value of the converted image signal. The gradation converting section 102 may reference the LUT 104 and output a gradation value corresponding to the gradation value of the input image signal as the gradation value of the converted image signal.

The LUT 104 may include an LUT corresponding to each of the R, G, and B components, or may correspond to arbitrary gradations. For example, the LUT 104 stores an output gradation expressed by 8 bits in association with 256 entries corresponding respectively to 256 gradations from 0 to 255 of the input gradation configured by 8 bits. The output gradation may be expressed by a different number of bits than the input gradation, and may be expressed by 10 bits, 12 bits, 14 bits, or the like, for example. The LUT 104 may be stored in advance in the image processing section 100. The LUT 104 may be operable to be set by the user of the display apparatus 10 or the like, for example.

The color converting section 106 performs a color conversion process on the image signal output from the gradation converting section 102. For example, the color converting section 106 strengthens or weakens a specified color according to a 3×3 matrix formed by conversion coefficients corresponding to the R, G, and B components.

The sharpening process section 110 performs a sharpening process on the image signal output from the color converting section 106. The sharpening process section 110 may perform the sharpening process using a sharpening filter 111. The sharpening process section 110 performs the sharpening process such that the MTF of the display apparatus 10 in a case where the sharpening process is performed becomes closer to 1.0 than the MTF of the display apparatus 10 in a case where the sharpening process is not performed.

The MTF of the display apparatus 10 may be a so-called display MTF or display system MTF. The MTF of the display apparatus 10 may be a function of the spatial frequency dependent on the surface processing, pixel structure, or the like of a display panel included in the display device 30.

The light passing through the display panel is scattered by the surface processing and pixel structure of the display panel. As a result, the image displayed on the display panel has reduced sharpness relative to the image indicated by the input image signal. In contrast to this, with the display apparatus 10 according to the present embodiment, the MTF of the display apparatus 10 can be brought close to 1.0 by having the sharpening process section 110 apply the sharpening process to the image signal and then displaying the image indicated by the image signal in the display device 30. In other words, it is possible to make the sharpness of the displayed image be closer to the sharpness of the image displayed by the input image signal than the sharpness of the image displayed by the display apparatus 10 in a case where the sharpening process is not performed.

The unevenness correcting section 130 performs an unevenness correction on the image signal output from the sharpening process section 110. For example, the unevenness correcting section 130 corrects the unevenness of luminance such that the luminance of the overall display panel of the display device 30 becomes uniform.

The gradation converting section 132 converts the gradation of the image signal output from the unevenness correcting section 130. The gradation converting section 132 may convert the gradation of the received image signal using the LUT 134. The LUT 134 may include an association between the gradation value of the input image signal and the gradation value of the converted image signal. The gradation converting section 132 may reference the LUT 134 and output the gradation value corresponding to the gradation value of the image signal as the gradation value of the converted image signal.

The LUT 134 may include an LUT corresponding to each of the R, G, and B components, or may correspond to arbitrary gradations. For example, the LUT 134 stores an output gradation expressed by 8 bits in association with 256 entries corresponding respectively to 256 gradations from 0 to 255 of the input gradation configured by 8 bits. The input gradation may be expressed by a different number of bits than the output gradation, and may be expressed by 10 bits, 12 bits, 14 bits, or the like, for example. The LUT 134 may be stored in advance in the image processing section 100.

The gradation converting section 132 may convert the gradation of the image signal in order to perform a γ correction corresponding to the display characteristics of the display device 30, using the LUT 134. The gradation converting section 132 may convert the gradation of the image signal in order to perform a γ correction that cancels out the γ characteristics of the display device 30, using the LUT 134. For example, the γ characteristics of the display device 30 are measured in advance, data concerning the γ characteristics corresponding to the inverse function of the measured γ characteristics is stored in the LUT 134, and the gradation converting section 132 converts the gradation of the image signal using this LUT 134.

The color number expanding section 136 performs a color number expansion process on the output value output from the gradation converting section 132, as needed. For example, the color number expanding section 136 performs dithering on the output value output from the gradation converting section 132. As another example, the color number expanding section 136 performs FRC (Frame Rate Control) on the output value output from the gradation converting section 132. The display control section 138 displays the image indicated by the image signal output from the color number expanding section 136 in the display device 30.

In the present embodiment, the sharpening process section 110 may be arranged at any position between the gradation converting section 102 and the gradation converting section 132. For example, the sharpening process section 110 is arranged between the gradation converting section 102 and the color converting section 106. The sharpening process section 110 may perform the sharpening process on the image signal output from the gradation converting section 102, and output the result to the color converting section 106. As another example, the sharpening process section 110 is arranged between the unevenness correcting section 130 and the gradation converting section 132. The sharpening process section 110 may perform the sharpening process on the image signal output from the unevenness correcting section 130 and output the result to the gradation converting section 132.

If the sharpening process section 110 is arranged ahead of the gradation converting section 102, the gradation conversion by the gradation converting section 102 is applied to the image signal to which the sharpening process has been applied. In this case, the gradation is arbitrarily converted by the gradation converting section 102, regardless of the sharpening process section 110 having performed the sharpening process such that the MTF of the display apparatus 10 in a case where the sharpening process is performed becomes closer to 1.0 than the MTF of the display apparatus 10 in a case where the sharpening process is not performed. Accordingly, it is impossible to keep the MTF of the display apparatus 10 in a case where the sharpening process is performed closer to 1.0 than the MTF of the display apparatus 10 in a case where the sharpening process is not performed. In contrast to this, the sharpening process section 110 according to the present embodiment performs the sharpening process after the gradation conversion by the gradation converting section 102, and therefore the MTF of the display apparatus 10 in a case where the sharpening process is performed can be suitably closer to 1.0 than the MTF of the display apparatus 10 in a case where the sharpening process is not performed.

The image processing section 100 does not necessarily need to include all of the gradation converting section 102, the color converting section 106, the unevenness correcting section 130, the gradation converting section 132, the color number expanding section 136, and the display control section 138. For example, the image processing section 100 may include only the gradation converting section 102 and the sharpening process section 110. Alternatively, the image processing section 100 may include only the gradation converting section 102, the sharpening process section 110, and the gradation converting section 132.

Figure 2:
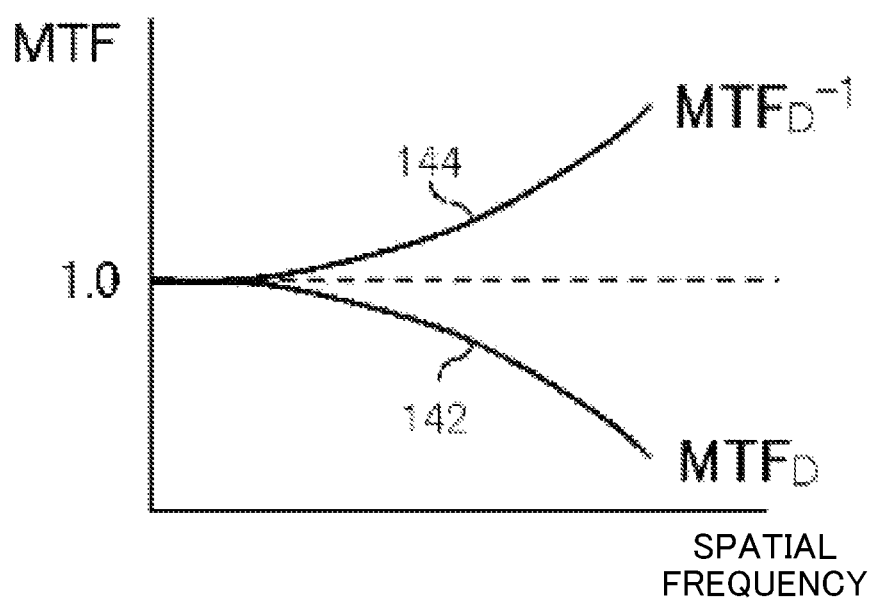
FIG. 2 is a diagram for describing a generation method of the sharpening filter 111.
Figure 3:
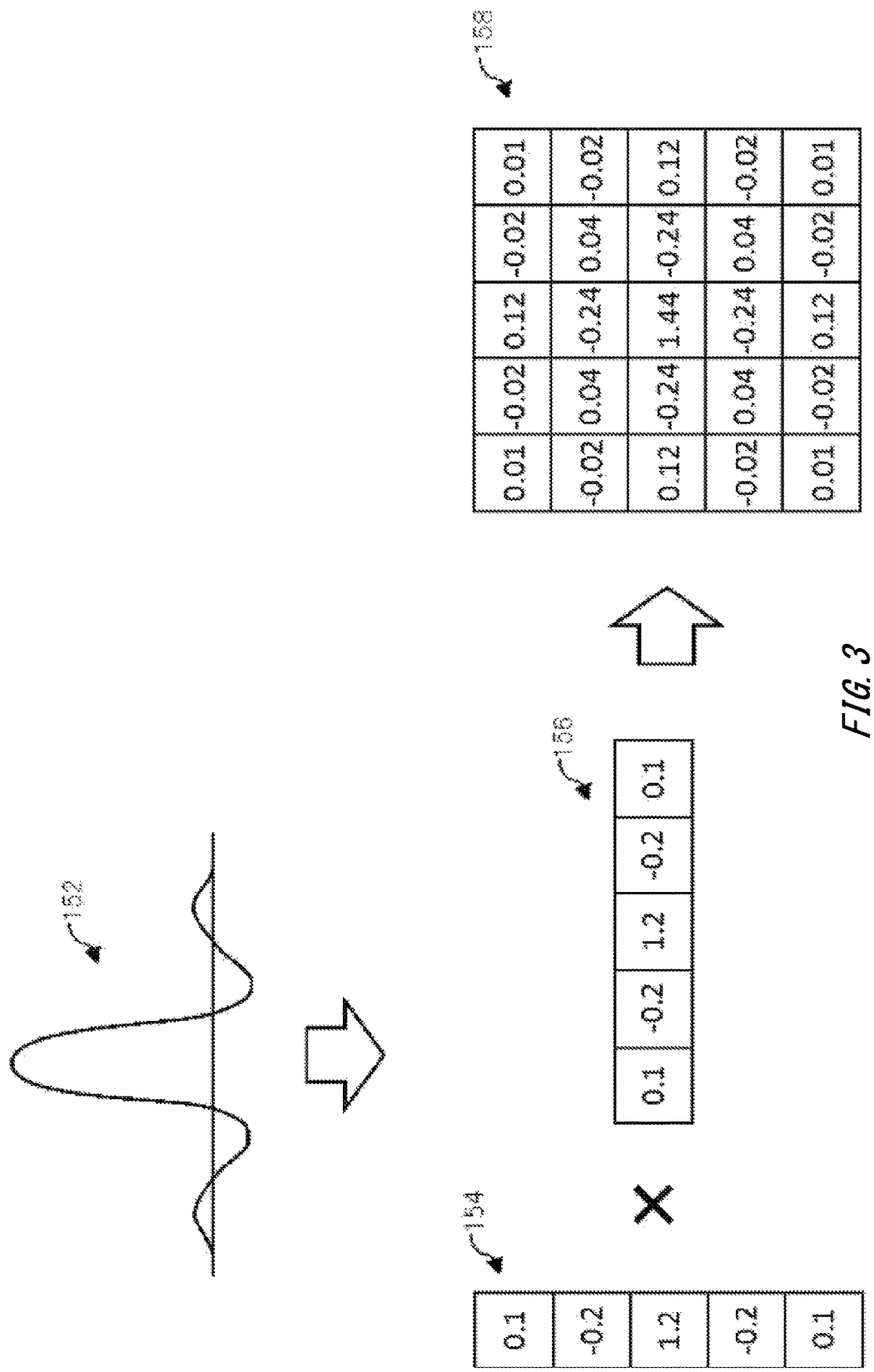
FIG. 3 is a diagram for describing a generation method of the sharpening filter 111.

FIGS. 2 and 3 are drawings for describing generation methods of the sharpening filter 111. Here, $MTF_D$ 142 shows an example of the MTF of the display apparatus 10 in a case where the sharpening process is not performed by the sharpening process section 110. As shown in FIG. 2, the $MTF_D$ 142 exhibits a lower value when the spatial frequency is higher. The $MTF_D$ 142 may be measured with a method using an LSF (Line Spread Function) for displaying a line in the display device 30, a method using a sine wave for displaying a sine wave image pattern with a signal generator, or the like. The $\text{MTF}_D^{-1}$ 144 shows the inverse function of the $\text{MTF}_D$ 142.

The filter characteristic 152 shows the filter characteristic of the sharpening filter 111. The filter characteristic 152 is obtained by performing an inverse Fourier transform on the $\text{MTF}_D^{-1}$ 144. The exemplary coefficient 158 shows an example of a coefficient of the sharpening filter 111. The sharpening filter 111 may perform the generation such that the total of the coefficients becomes 1.0, in order to set the zero frequency component of the MTF to 1.0. For example, first, the one-dimensional filter coefficients (Fh, Fv) respectively in the horizontal direction and vertical direction are calculated from the inverse of the MTF in each of the horizontal direction and the vertical direction. The one-dimensional filter coefficient Fh 154 and the one-dimensional filter coefficient Fv 156 are examples of these filter coefficients. The sharpening filter 111, which is a two-dimensional filter, is generated by calculating the matrix product of the one-dimensional filter coefficients (Fh, Fv). The numerical values of the one-dimensional filter coefficient Fh 154, the one-dimensional filter coefficient Fv 156, and the exemplary coefficient 158 are examples, and may be other values instead. Here, an example is shown in which the filter size is 5×5, but the filter size is not limited to this, and the sharpening filter 111 may be another size.

Figure 4:
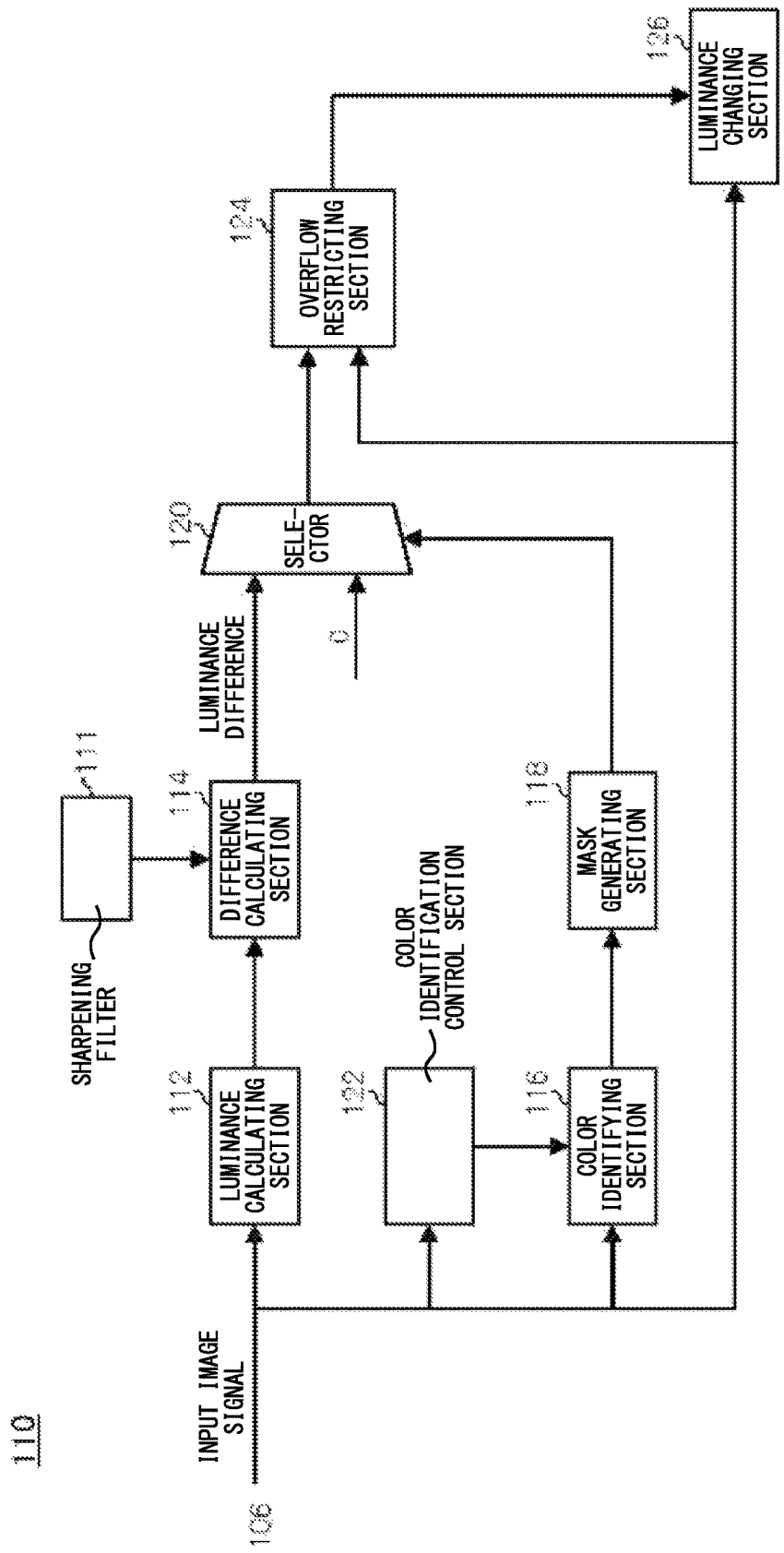
FIG. 4 is a functional configuration diagram schematically showing an exemplary functional configuration of the sharpening process section 110.

FIG. 4 is a functional configuration diagram schematically showing an exemplary functional configuration of the sharpening process section 110. The sharpening process section 110 includes a luminance calculating section 112, a difference calculating section 114, a color identifying section 116, a mask generating section 118, a selector 120, a color identification control section 122, an overflow restricting section 124, and a luminance changing section 126. The sharpening process section 110 does not necessarily need to include all of these sections.

The luminance calculating section 112 calculates the luminance of each of the plurality of pixels of the image indicated by the input image signal input to the sharpening process section 110. The difference calculating section 114 calculates the luminance difference between the luminance calculated by the luminance calculating section 112 and the luminance resulting from the sharpening filter 111 being applied to the luminance calculated by the luminance calculating section 112, for each of the plurality of pixels of the image indicated by the input image signal.

The color identifying section 116 identifies pixels with a saturation that is higher than a predetermined threshold value, among the plurality of pixels indicated by the input image signal. The mask generating section 118 generates a mask for pixels identified by the color identifying section 116 as having a saturation higher than the predetermined threshold value that are present within the range of the sharpening filter 111. For example, in a case where the size of the sharpening filter 111 is 5×5, when a pixel identified as having a saturation that is higher than the predetermined threshold value is present within a range of 5×5 pixels around one pixel, the mask generating section 118 generates a mask for this one pixel.

The selector 120 outputs, to the overflow restricting section 124, a value of 0 for each pixel masked by the mask generating section 118 and the luminance difference calculated by the difference calculating section 114 for each other pixel, among the plurality of pixels of the image indicated by the input image signal.

The color identification control section 122 controls the color identifying section 116. For example, when the image indicated by the input image signal is a monochrome image and not a color image, the color identification control section 122 deactivates the color identifying section 116. As another example, when the display apparatus 10 is a monochrome image display apparatus and the mode for inputting a monochrome image that has been converted from a color image by the image input section 20 into the image processing section 100 is active, the color identification control section 122 deactivates the color identifying section 116. If the image processing section 100 is for a monochrome image display apparatus, the image processing section 100 does not need to include the color identifying section 116, the mask generating section 118, and the selector 120.

The overflow restricting section 124 identifies pixels having a pixel value that is higher than an upper limit value or lower than a lower limit value, by applying the luminance differences output from the selector 120 to the plurality of pixels of the image indicated by the input image signal. Applying the luminance difference to a pixel may be changing the pixel value of this pixel such that the luminance value of this pixel changes by the value of the luminance difference. When only luminance information is input as the input image signal, applying the luminance difference to a pixel may be adding the luminance difference to the luminance value of the pixel. The value applied to each of the plurality of pixels may be referred to as the applied difference.

The overflow restricting section 124 adjusts the value of the applied difference such that the pixel value of the identified pixel resulting from the applied difference being applied to this pixel is not higher than the upper limit value or lower than the lower limit value. The overflow restricting section 124 outputs, to the luminance changing section 126, the value of the applied difference after adjustment for each identified pixel and the value of the applied difference output from the selector 120 for each other pixel.

The luminance changing section 126 changes each luminance of the input image signal, based on the applied difference output from the overflow restricting section 124. The luminance changing section 126 applies the applied difference adjusted by the overflow restricting section 124 for each pixel identified by the overflow restricting section 124. The luminance changing section 126 applies the luminance difference output by the selector 120 for each pixel not identified by the overflow restricting section 124. In other words, the luminance changing section 126 applies the luminance difference calculated by the difference calculating section 114 for each pixel that is not masked by the mask generating section 118, and does not change the luminance for each pixel masked by the mask generating section 118.

Figure 5:
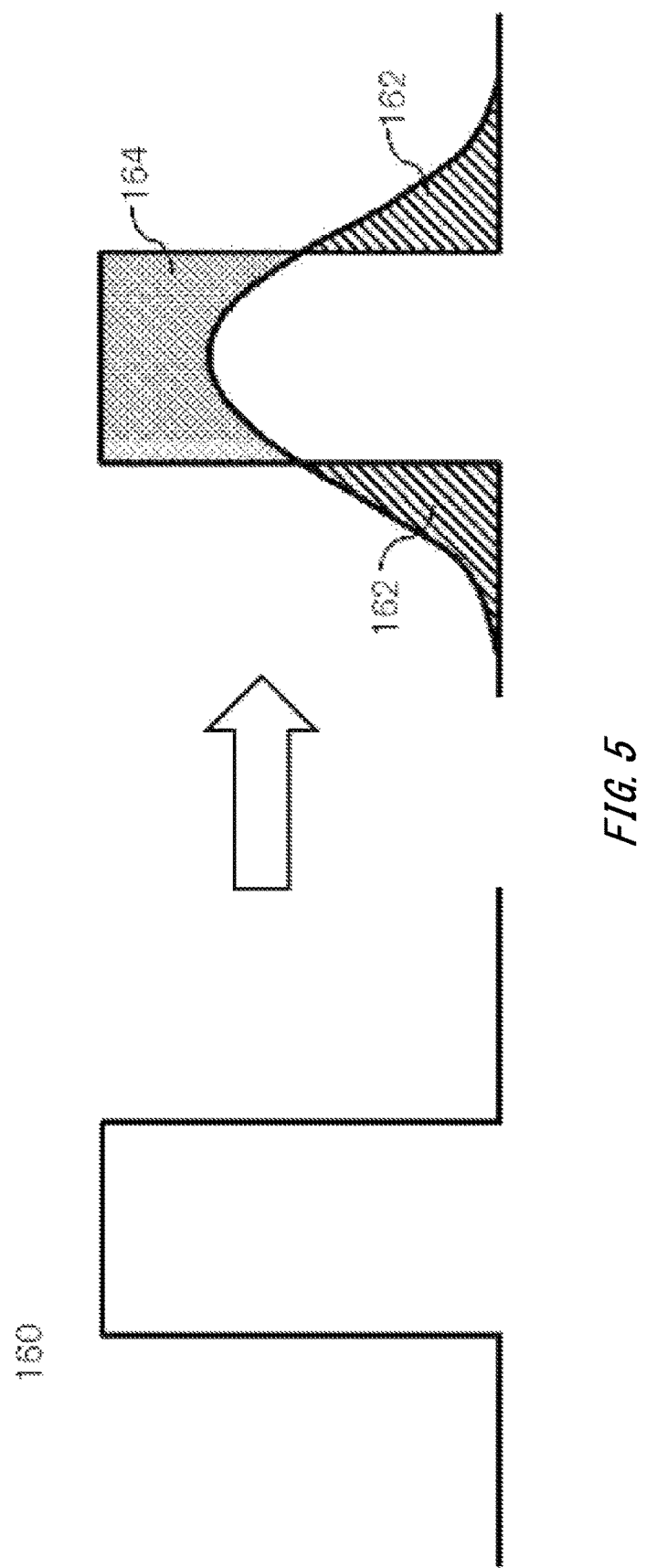
FIG. 5 is a schematic view of the basics of the sharpening process.

FIG. 5 is a schematic view of the basics of the sharpening process performed by the sharpening process section 110. The input image signal 160 expresses the luminance value of the input image signal, the scattered component 162 indicates a component scattered by the display characteristics of the display device 30, and the attenuated component 164 indicates a component attenuated by the display characteristics of the display device 30.

With the sharpening process performed by the sharpening process section 110 according to the present embodiment, by changing the luminance of the input image signal based on the luminance difference calculated by the difference calculating section 114, the scattered component 162 is removed from the image displayed by the display device 30 and the attenuated component 164 is amplified or added. In this way, it is possible to accurately reproduce the sharpness of the input image signal.

As an example, for diagnostic medical monitors or the like, physical evaluation (quantitative evaluation) is important for realizing safety and effectiveness as a medical device, but if the sharpening process is applied arbitrarily to the image, the quantitative evaluation is negatively affected. This is because there are cases where it is impossible to suitably express the original sharpness of the image. In contrast to this, with the image processing section 100 according to the present embodiment, the amount of sharpness lost due to the display characteristics of the display device 30 can be suitably corrected, and it is possible to suitably express the original sharpness of the image indicated by the input image signal.

Figure 6:
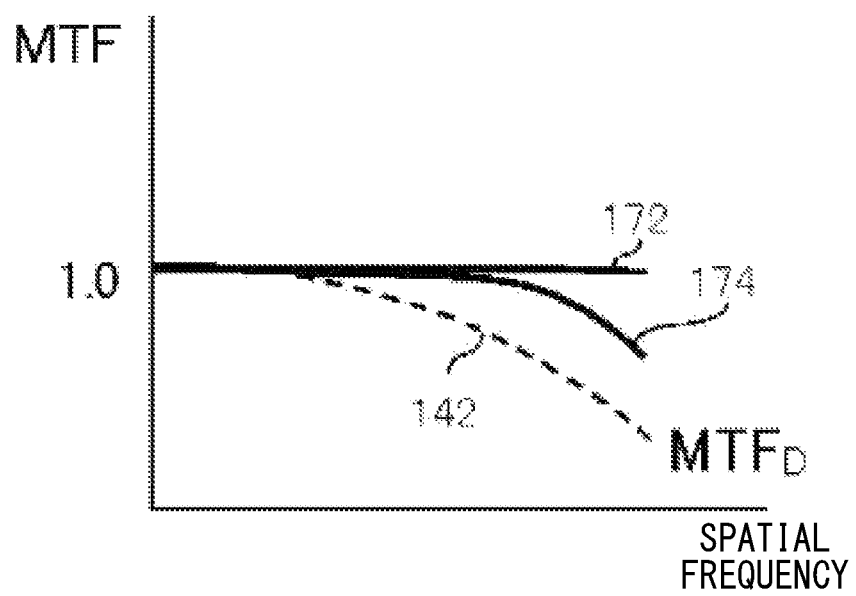
FIG. 6 schematically shows an exemplary MTF of the display apparatus 10 in a case where the sharpening process is performed.

FIG. 6 schematically shows an exemplary MTF of the display apparatus 10 in a case where the sharpening process is performed. As shown by the MTF 172 and the MTF 174 in FIG. 6, the MTF of the display apparatus 10 in a case where the sharpening process is performed by the sharpening process section 110 is closer to 1.0 than the $MTF_D$ 142 of the display apparatus 10 in a case where the sharpening process is not performed by the sharpening process section 110.

The MTF of the display apparatus 10 in a case where the sharpening process is performed being closer to 1.0 than the $MTF_D$ 142 may refer to this MTF being closer to 1.0 across the entire spatial frequency band. Alternatively, the MTF of the display apparatus 10 in a case where the sharpening process is performed being closer to 1.0 than the $MTF_D$ 142 may refer to the average value of this MTF being closer to 1.0 across the entire spatial frequency band. As another example, MTF of the display apparatus 10 in a case where the sharpening process is performed being closer to 1.0 than the $MTF_D$ 142 may refer to this MTF being closer to 1.0 in a partial region within the entire spatial frequency band.

The MTF 172 shows an example in which the MTF of the display apparatus 10 in a case where the sharpening process is performed is absolutely closer to 1.0 across the entire spatial frequency band. The MTF 174 shows an example in which the MTF of the display apparatus 10 in a case where the sharpening process is performed is absolutely closer to 1.0 in a portion of the spatial frequency band. The sharpening process section 110 may perform the sharpening process such that the MTF becomes 1.0 until an intermediate spatial frequency and then becomes lower than 1.0 as the spatial frequency becomes higher, as shown by the MTF 174, for example.

As long as the MTF of the display apparatus 10 in a case where the sharpening process is performed is closer to 1.0 than the $MTF_D$ 142, the sharpening process section 110 may perform the sharpening process such that this MTF approaches a value other than 1.0. For example, the sharpening process section 110 may cause the MTF of the display apparatus 10 in a case where the sharpening process is performed to approach a value other than 1.0 by adjusting the sharpening filter 111.

Figure 7:
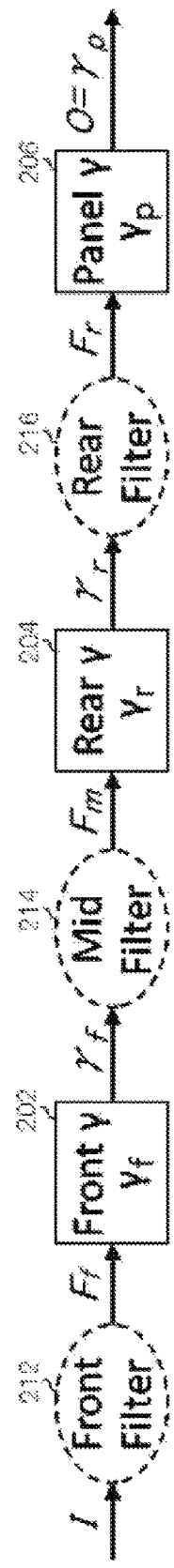
FIG. 7 is a diagram for describing differences in the processing results due to different timings of the sharpening process performed by the sharpening process section 110.

FIG. 7 is a diagram for describing differences in the processing results due to different timings of the sharpening process performed by the sharpening process section 110. Here, Front γ ($\gamma_f$) 202 indicates the γ correction by the gradation converting section 102. Rear γ ($\gamma_r$) 204 indicates the γ correction by the gradation converting section 132. Panel γ ($\gamma_p$) 206 indicates the γ characteristic of the display device 30. Front γ 202, Rear γ 204, and Panel γ 206 are each a nonlinear function.

Front Filter 212, Mid Filter 214, and Rear Filter 216 are exemplary arrangements of the sharpening process section 110. Front Filter 212 indicates the arrangement in a case where the sharpening process is performed before the gradation conversion by the gradation converting section 102. Mid Filter 214 indicates the arrangement in a case where the sharpening process is performed after the gradation conversion by the gradation converting section 102 and before the gradation conversion by the gradation converting section 132. Rear Filter 216 indicates the arrangement in a case where the sharpening process is performed after the gradation conversion by the gradation converting section 132.

For Rear γ 204, the adjustment is performed such that the output signal O and Rear γ 204 have a linear relationship, as shown in Expression 1 and Expression 2.

$$\gamma_r(i) = \gamma_p^{-1}(\alpha i) \qquad \text{Expression 1}$$

$$\gamma_p(\gamma_r(i)) = \gamma_p(\gamma_p^{-1}(\alpha i)) = \alpha i \qquad \text{Expression 2}$$

For Front γ 202, the adjustment is performed such that the Rear γ 204 input signal becomes γ=2, for example, as shown in Expression 3.

$$\gamma_f(i) = bi^2 \qquad \text{Expression 3}$$

When the sharpening process is not performed by the sharpening process section 110, the output signal $O_n(x)$ is expressed by Expression 4.

$$O_n(x) = \gamma_p(\gamma_r(\gamma_f(I(x)))) = abI(x)^2 \qquad \text{Expression 4}$$

The sharpening process section 110 performs the calculation shown in Expression 5.

$$F(I(x)) = \sum_{\Delta x \in B} c(\Delta x) I(x + \Delta x) \qquad \text{Expression 5}$$

It should be noted that x is the coordinate, B is the filter range, and $c(\Delta x)$ is the filter coefficient.

If the filter coefficient can be applied linearly to the output signal $O_n(x)$, the MTF of the display apparatus 10 in a case where the sharpening process is performed as designed can be processed to be closer to 1.0 than the MTF of the display apparatus 10 in a case where the sharpening process is not performed.

Expression 6 shows the computational formula in a case where the sharpening process section 110 has the Front Filter 212 arrangement.

$$\begin{aligned} O(x) &= \gamma_p(\gamma_r(\gamma_f(F_f(I(x))))) \qquad \text{Expression 6} \\ &= a\gamma_f\left(\sum_{\Delta x \in B} c(\Delta x) I(x + \Delta x)\right) \\ &= ab\left(\sum_{\Delta x \in B} c(\Delta x) I(x + \Delta x)\right)^2 \\ &= ab\left(\sum_{\Delta x \in B} c(\Delta x)^2 I(x + \Delta x)^2 + \ldots\right) \end{aligned}$$

Expression 6 shows that the coefficient $c(\Delta x)$ is affected by Front γ 202. Due to the cross term ( . . . ), an interaction occurs between the coefficients and pixels. In this way, when the sharpening process section 110 has the Front Filter 212 arrangement, the filter coefficient cannot be applied linearly to the output signal $O_n(x)$.

Expression 7 shows the computational formula in a case where the sharpening process section 110 has the Mid Filter 214 arrangement.

$$O(x) = \gamma_p(\gamma_r(F_m(\gamma_r(I(x)))))$$

$$= aF_m(\gamma_f(I(x)))$$

$$= \left(\sum_{\Delta x \in B} c(\Delta x) O_n(x + \Delta x)^2\right)$$

Expression 7

Expression 7 shows that the filter coefficient can be applied linearly to the output signal $O_n(x)$ in a case where the sharpening process is not performed by the sharpening process section 110.

Expression 8 shows a computational formula in a case where the sharpening process section 110 has the Rear Filter 216 arrangement.

$$O(x) = \gamma_p(F_r(\gamma_r(\gamma_f(I(x)))))$$

$$= \gamma_p(F_r(\gamma_p^{-1}(abI(x)^2)))$$

$$= \gamma_p\left(\sum_{\Delta x \in B} c(\Delta x)\gamma_p^{-1}(O_n(x + \Delta x))\right)$$

Expression 8

Expression 8 shows that, since $\gamma_p(x)$ is a nonlinear function, additivity is not established and the filter coefficient cannot be applied linearly.

As described above, with the sharpening process section 110 according to the present embodiment, it is possible to apply the filter linearly by performing the sharpening process after the gradation conversion by the gradation converting section 102 and before the gradation conversion by the gradation converting section 132, and therefore the MTF of the display apparatus 10 in a case where the sharpening process is performed can more suitably approach 1.0 than the MTF of the display apparatus 10 in a case where the sharpening process is not performed.

Figure 8:
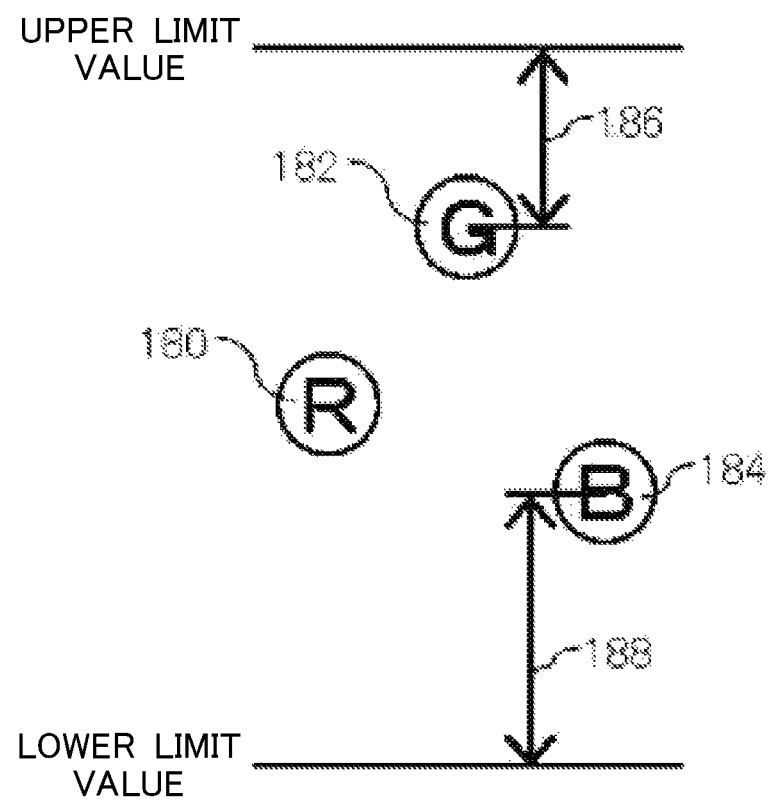
FIG. 8 is a diagram for describing the process performed by the overflow restricting section 124.

FIG. 8 is a diagram for describing the process performed by the overflow restricting section 124. The R component 180, the G component 182, and the B component 184 respectively indicate the R, G, and B components of one pixel among the plurality of pixels indicated by the input image signal.

The overflow restricting section 124 calculates the difference value 186 between the maximum value and the upper limit value among the R component 180, the G component 182, and the B component 184, and also calculates the difference value 188 between the minimum value and the lower limit value among the R component 180, the G component 182, and the B component 184. The overflow restricting section 124 then sets the minimum value among the calculated difference values as the minimum difference value, and compares the value of the luminance difference calculated by the difference calculating section 114 for this pixel to this minimum difference value. When the value of the luminance difference is larger than the minimum difference value, the overflow restricting section 124 sets the magnitude of the applied difference that is applied to this pixel to be the magnitude of the minimum difference value.

The overflow restricting section 124 may limit the correctable range for each pixel among the plurality of pixels, according to Expression 9.

$$m(x,y) = \min(2 \times (255 - n(x,y)), 2 \times n(x,y))$$

Expression 9

It should be noted that (x, y) are the coordinates in the actual region, m(x, y) is the maximum value of the correction value, and n(x, y) is the input signal level (8 bit).

Figure 9:
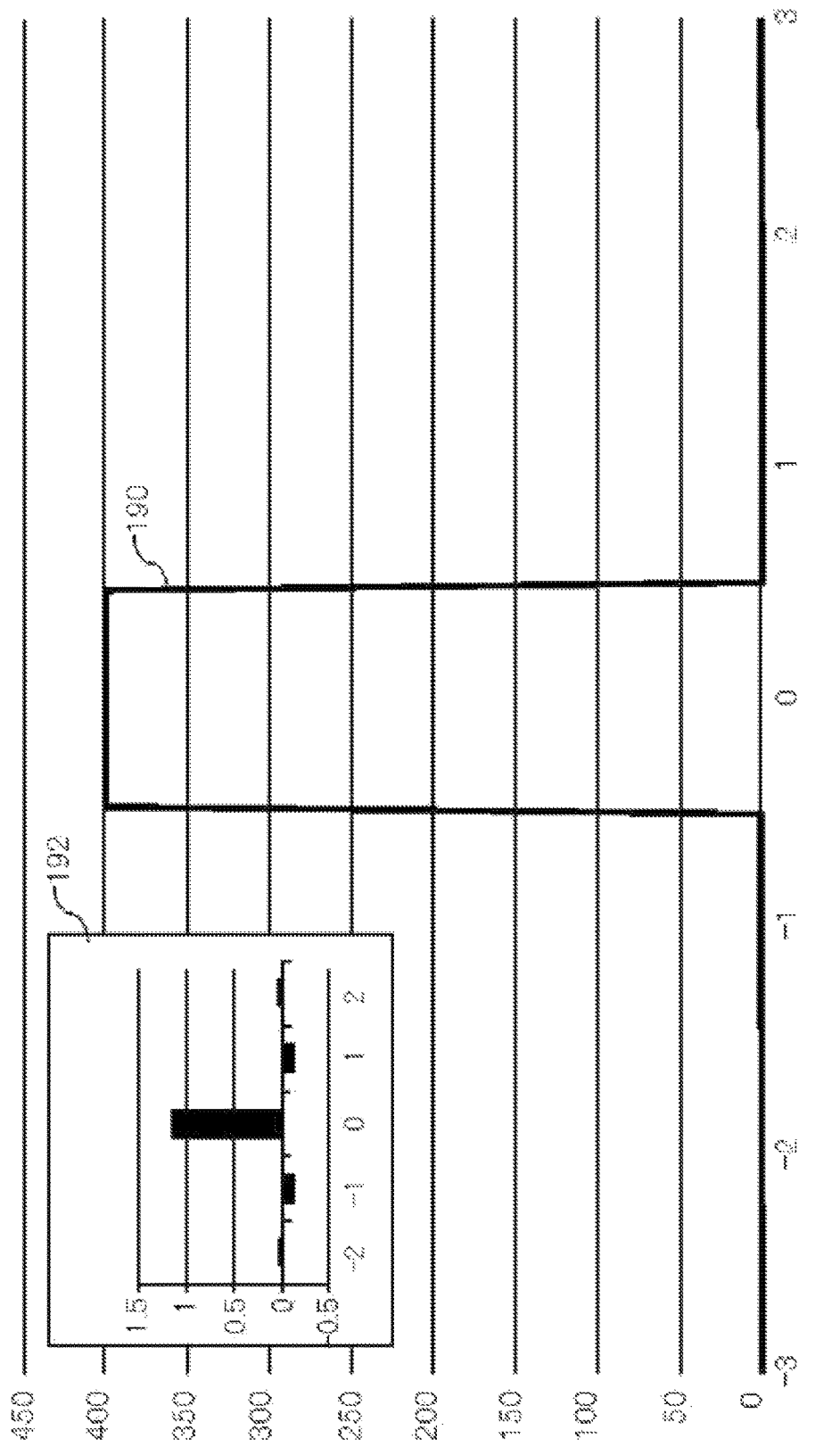
FIG. 9 is a diagram for describing the overflow restriction.
Figure 10:
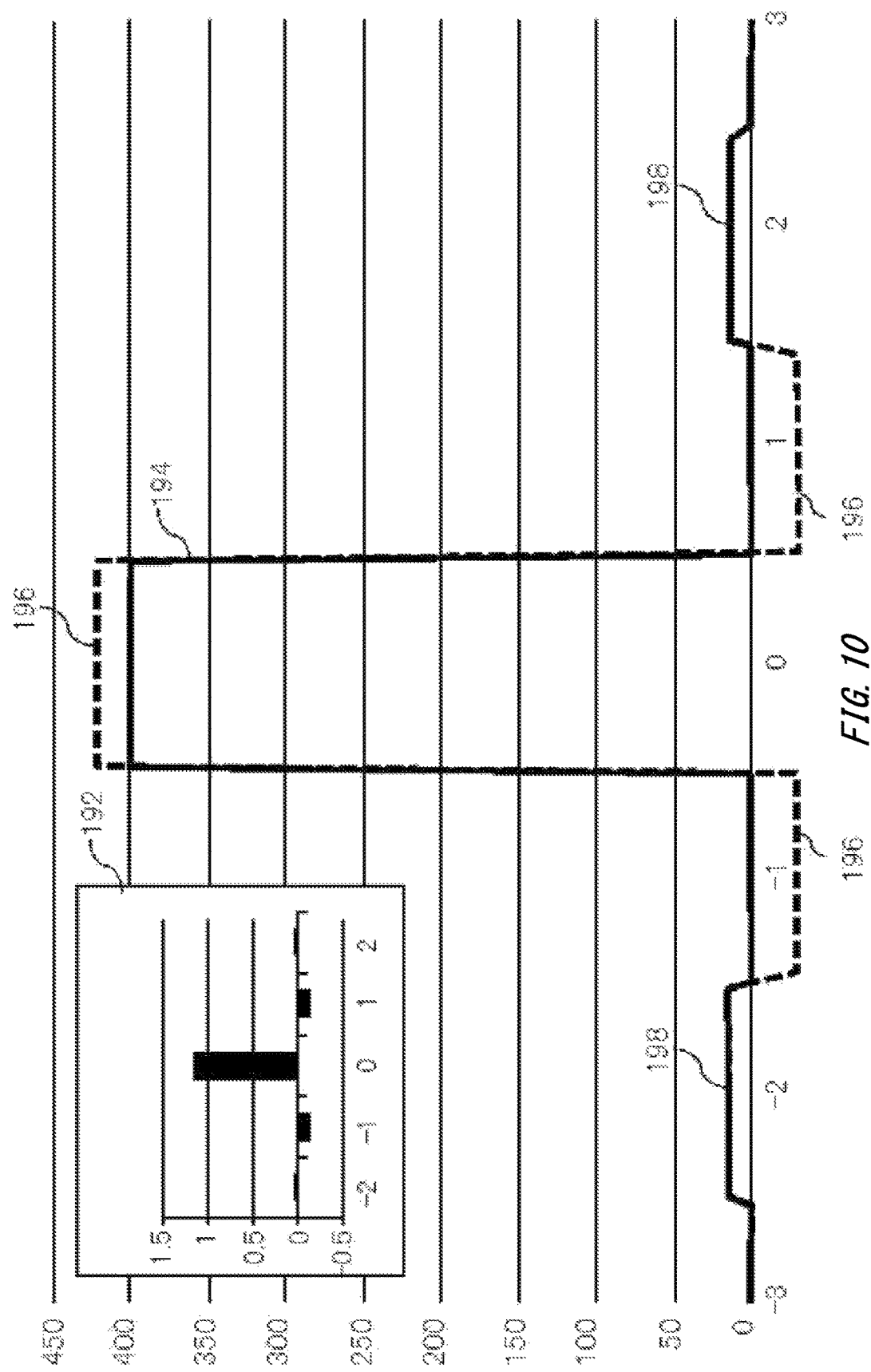
FIG. 10 is a diagram for describing the overflow restriction

FIGS. 9 and 10 are diagrams for describing the overflow restriction performed by the overflow restricting section 124. FIG. 9 shows a luminance component 190 of a sample image signal indicating an image a white line of one pixel on a black background. The filter coefficient 192 indicates an exemplary coefficient of the sharpening filter 111 applied to the sample image signal.

FIG. 10 shows the luminance component 194 of the output signal in a case where the sharpening process by the sharpening process section 110 using the filter coefficient 192 is applied to the sample image signal. Here, the luminance component of the output signal is shown in a range-over case, where the pixel value after the sharpening process by the sharpening process section 110 is above the upper limit value or below the lower limit value.

As shown in FIG. 10, the luminance is saturated due to the range-over where the amplification enhanced component 196 is supposed to appear had the range-over not occurred, and therefore there are cases where only an MTF restriction component 198 appears and the amplification enhanced component 196 does not appear. The MTF restriction component 198 is a component having a characteristic of preventing the MTF from becoming too high, and is generated when an inverse Fourier transform is performed on the $MTF_D^{-1}$ 144. In this way, when the range-over occurs, there are cases where only the MTF restriction component 198 functions and, as a result, the MTF drops. In contrast to this, with the image processing section 100 according to the present embodiment, the applied difference is adjusted by the overflow restricting section 124 such that the pixel value resulting from the applied difference being applied to the plurality of pixels of the image indicated by the image signal does not become higher than the upper limit value or lower than the lower limit value, and therefore it is possible to prevent such a state from occurring.

In the above description, each component of the image processing section 100 may be realized by hardware or by software, or by a combination of hardware and software. Furthermore, a computer may function as the image processing section 100 by executing a program. The program may be installed in the computer that forms at least a portion of the image processing section 100, from a computer-readable storage medium or a storage apparatus connected to a network.

The program that is installed in the computer and causes the computer to function as the image processing section 100 according to the present embodiment affects the CPU and the like to cause the computer to function as each section of the image processing section 100. The information processes recorded in the program are read by the computer, thereby causing the software and hardware resources of the image processing section 100 to work together as the specific means.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: display apparatus, 20: image input section, 30: display device, 100: image processing section, 102: gradation converting section, 104: LUT, 106: color converting section, 110: sharpening process section, 111: sharpening filter, 112: luminance calculating section, 114: difference calculating section, 116: color identifying section, 118: mask generating section, 120: selector, 122: color identification control section, 124: overflow restricting section, 126: luminance changing section, 130: unevenness correcting section, 132: gradation converting section, 134: LUT, 136: color number expanding section, 138: display control section, 142: $MTF_D$, 144: $MTF_D^{-1}$, 152: filter characteristic, 154: one-dimensional filter coefficient Fh, 156: one-dimensional filter coefficient Fv, 158: exemplary coefficient, 160: input image signal, 162: scattered component, 164: attenuated component, 172: MTF, 174: MTF, 180: R component, 182: G component, 184: B component, 186: difference value, 188: difference value, 190: luminance component, 192: filter coefficient, 194: luminance component, 196: amplification enhanced component, 198: MTF restriction component, 202: Front γ, 204: Rear γ, 206: Panel γ, 212: Front Filter, 214: Mid Filter, 216: Rear Filter

What is claimed is:

1. An image processing apparatus comprising a processor that is configured to perform processes including:
a first gradation converting process that converts a gradation of an image signal input thereto;
a sharpening process performed on the image signal after the gradation has been converted by the first gradation converting process;
a second gradation converting process that converts the gradation of the image signal after the sharpening process has been performed; and
a display control process that displays an image indicated by the image signal after the gradation has been converted by the second gradation converting process, in a display device, wherein
the second gradation converting process converts the gradation of the image signal after the sharpening process has been performed, to perform a γ correction that cancels out a γ characteristic of the display device,
a filter coefficient of a sharpening filter applied to the image signal by the sharpening process is linear with respect to an output signal of the display device,
the sharpening process includes:
a luminance calculating process that calculates a luminance of each of a plurality of pixels of the image indicated by the image signal;
a difference calculating process that calculates a difference between the luminance and a luminance resulting from the sharpening filter being applied to the luminance, for each of the plurality of pixels; and
a luminance changing process that changes the luminance of each of the plurality of pixels, based on the difference calculated by the difference calculating process, and
the luminance changing process, for each of the plurality of pixels, obtains a first difference value between a maximum value and an upper limit value of RGB values of the pixel and a second difference value between a minimum value and a lower limit value of the RGB values of the pixel and, when an absolute value of the difference calculated by the difference calculating process is larger than a minimum difference value among the first difference value and the second difference value, changes the luminance of the pixel based on the minimum difference value.

2. The image processing apparatus according to claim 1, wherein
the sharpening process performed on the image signal removes a scattered component from the image indicated by the image signal and performs at least one of amplifying an attenuated component and adding the attenuated component.

3. The image processing apparatus according to claim 1, wherein
the difference calculating process, for each of the plurality of pixels, calculates a difference between (i) a luminance resulting from applying to the luminance the sharpening filter generated based on a filter characteristic calculated by performing an inverse Fourier transform on an inverse function of a Modulation Transfer Function (MTF) of the display device displaying the image indicated by the image signal and (ii) the luminance calculated by the luminance calculating process.

4. The image processing apparatus according to claim 1, wherein
the sharpening process further includes:
a color identifying process that identifies a pixel with a saturation that is higher than a predetermined threshold value, among the plurality of pixels of the image indicated by the image signal; and
a mask generating process that generates a mask for pixels identified by the color identifying process as having a saturation that is higher than the predetermined threshold value that are present in a range of the sharpening filter, and
the luminance changing process does not change the luminance of the pixels for which the mask is generated.

5. A display apparatus comprising:
the image processing apparatus according to claim 1; and
the display device.

6. The display apparatus according to claim 5, wherein
a Modulation Transfer Function (MTF) of the display apparatus in a case where the sharpening process is performed is closer to 1.0 than the MTF of the display apparatus in a case where the sharpening process is not performed.

7. A non-transitory computer-readable storage medium storing thereon a program that causes a computer to function as:
a first gradation converting section that converts a gradation of an image signal input thereto;
a sharpening process section that performs a sharpening process on the image signal after the gradation has been converted by the first gradation converting section;

a second gradation converting section that converts the gradation of the image signal after the sharpening process has been performed; and a display control section that displays an image indicated by the image signal after the gradation has been converted by the second gradation converting section, in a display device, wherein the second gradation converting section converts the gradation of the image signal after the sharpening process has been performed, to perform a γ correction that cancels out a γ characteristic of the display device, a filter coefficient of a sharpening filter applied to the image signal by the sharpening process section is linear with respect to an output signal of the display device, the sharpening process section includes:
    a luminance calculating section that calculates a luminance of each of a plurality of pixels of the image indicated by the image signal;
    a difference calculating section that calculates a difference between the luminance and a luminance resulting from the sharpening filter being applied to the luminance, for each of the plurality of pixels; and
    a luminance changing section that changes the luminance of each of the plurality of pixels, based on the difference calculated by the difference calculating section, and the luminance changing section, for each of the plurality of pixels, obtains a first difference value between a maximum value and an upper limit value of RGB values of the pixel and a second difference value between a minimum value and a lower limit value of the RGB values of the pixel and, when an absolute value of the difference calculated by the difference calculating section is larger than a minimum difference value among the first difference value and the second difference value, changes the luminance of the pixel based on the minimum difference value.

8. An image processing method comprising:

a first gradation converting process that converts a gradation of an image signal input thereto;

a sharpening process performed on the image signal after the gradation has been converted by the first gradation converting process;

a second gradation converting process that converts the gradation of the image signal after the sharpening process has been performed; and a display control process that displays an image indicated by the image signal after the gradation has been converted by the second gradation converting process, in a display device, wherein the second gradation converting process converts the gradation of the image signal after the sharpening process has been performed, to perform a γ correction that cancels out a γ characteristic of the display device, a filter coefficient of a sharpening filter applied to the image signal by the sharpening process is linear with respect to an output signal of the display device, the sharpening process includes:
    a luminance calculating process that calculates a luminance of each of a plurality of pixels of the image indicated by the image signal;
    a difference calculating process that calculates a difference between the luminance and a luminance resulting from the sharpening filter being applied to the luminance, for each of the plurality of pixels; and
    a luminance changing process that changes the luminance of each of the plurality of pixels, based on the difference calculated by the difference calculating process, and the luminance changing process, for each of the plurality of pixels, obtains a first difference value between a maximum value and an upper limit value of RGB values of the pixel and a second difference value between a minimum value and a lower limit value of the RGB values of the pixel and, when an absolute value of the difference calculated by the difference calculating process is larger than a minimum difference value among the first difference value and the second difference value, changes the luminance of the pixel based on the minimum difference value.

\* \* \* \* \*